United States Patent

[11] 3,573,715

| [72] | Inventor | Don L. De Lano |
| | | Mt. Clemens, Mich. |
| [21] | Appl. No. | 785,314 |
| [22] | Filed | Dec. 19, 1968 |
| [45] | Patented | Apr. 6, 1971 |
| [73] | Assignee | Microdot Inc. |
| | | New York, N.Y. |

[54] PUSH-IN SOCKET
10 Claims, 9 Drawing Figs.

[52] U.S. Cl. .................................................. 339/128
[51] Int. Cl. ................................................... H02b 1/02
[50] Field of Search ............................................ 339/127, 128, 17 (D)

[56] References Cited
UNITED STATES PATENTS

| 2,616,944 | 11/1952 | Bedford.......................... | 339/128 |
| 3,362,007 | 1/1968 | Delano........................... | 339/128X |
| 3,378,812 | 4/1968 | Fitzgerald....................... | 399/128X |

Primary Examiner—Ernest R. Purser
Attorney—Harness, Dickey & Pierce

ABSTRACT: The socket is releasably applied in locked position to an apertured support by the act of directly pushing the socket into the aperture.

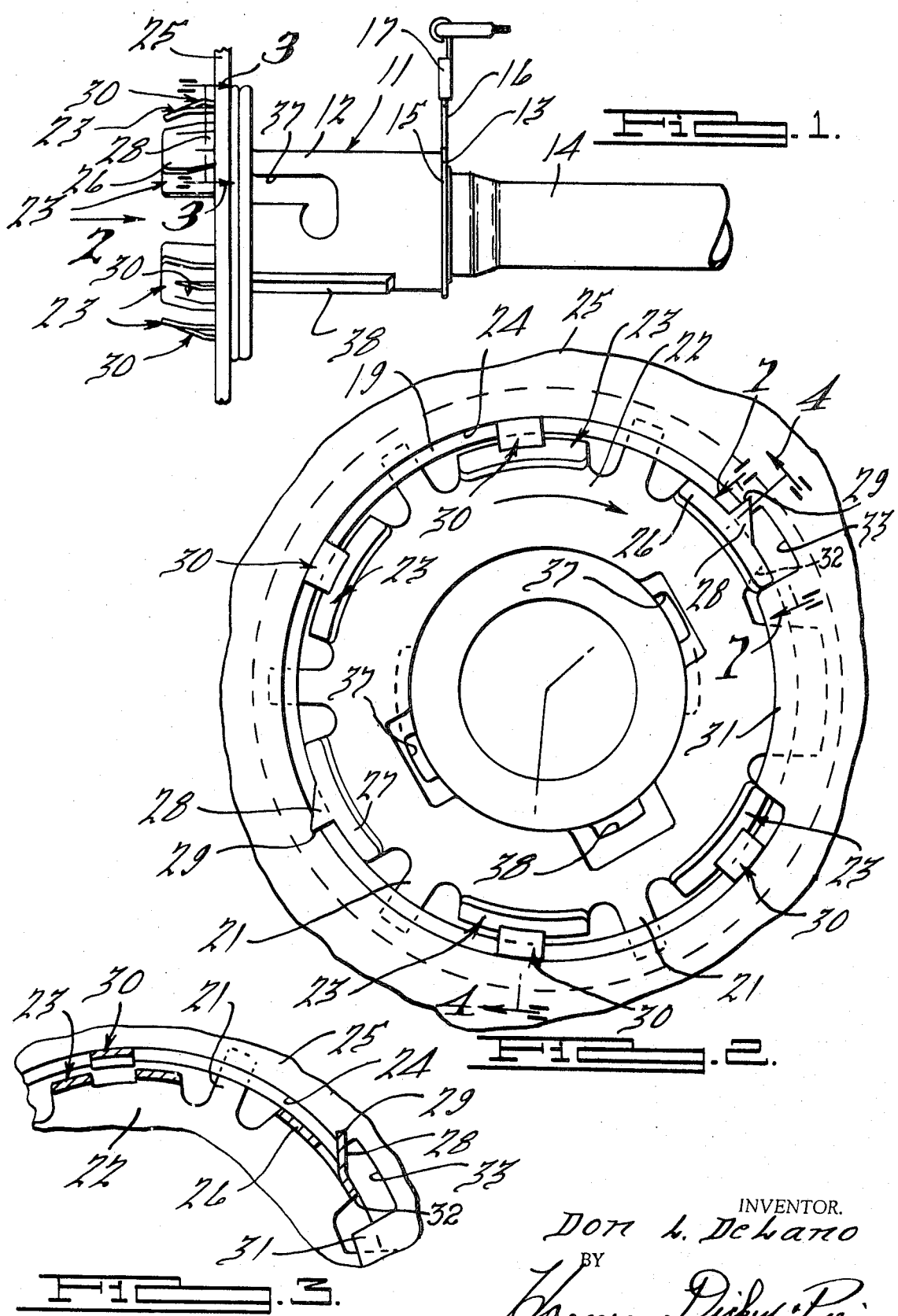

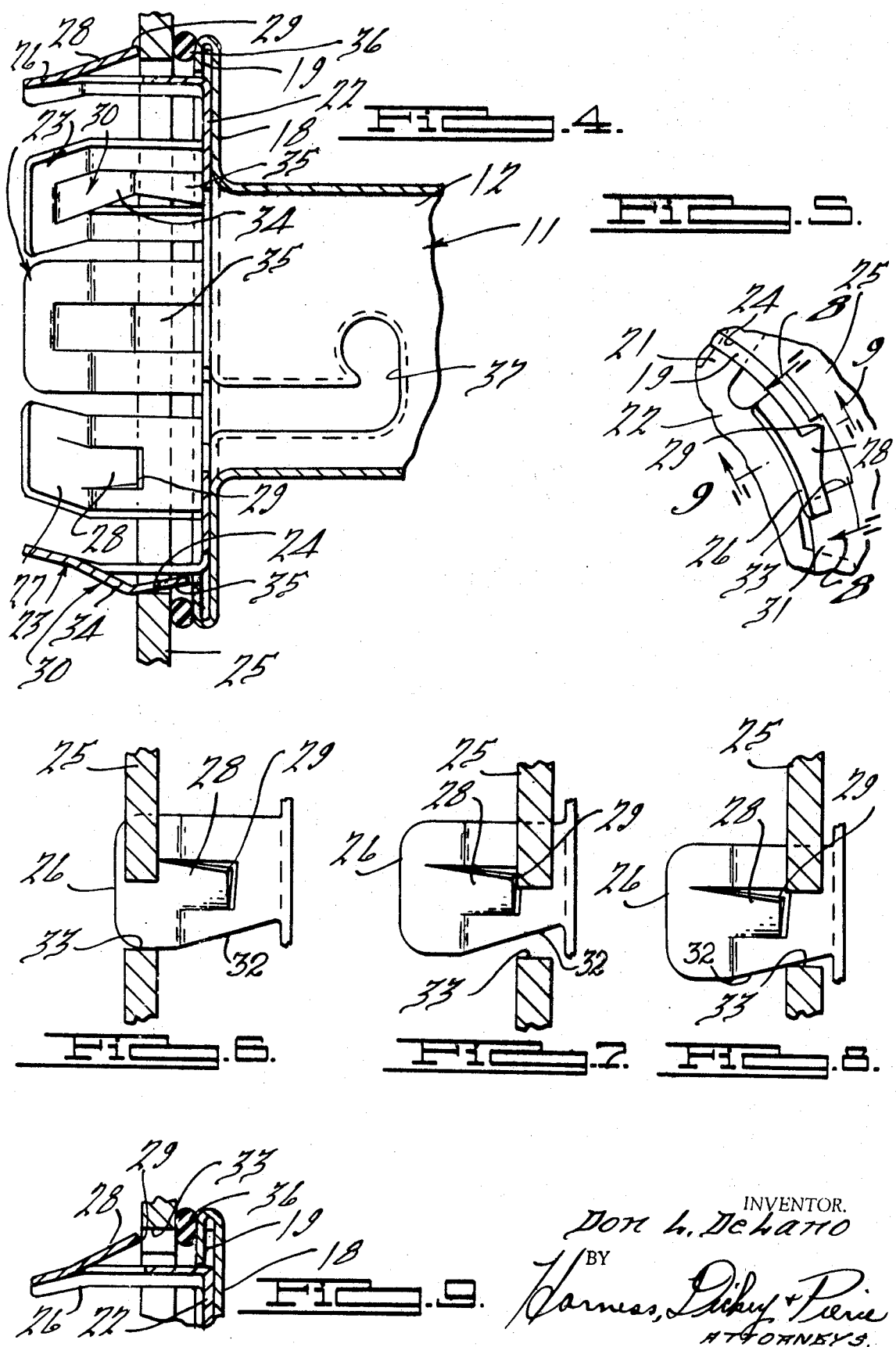

PUSH-IN SOCKET

BACKGROUND OF THE INVENTION

Heretofore a socket was applied to an apertured receptacle or other support by pushing it into the aperture and thereafter rotating the socket into latched position. It was found that the rotation movement was often slighted and as a result the socket was not properly installed and eventually would become loose and fall from the receptacle. The installation of the socket by the pushing movement to releasably lock the socket in the receptacle is a substantial advancement in the socket art.

SUMMARY OF THE INVENTION

The socket has a cylindrical body with oppositely disposed bayonet-type slots in the sidewalls for the reception of the base of the lamp which is locked therein by the extending pins when engaged within the lateral projections of the bayonet slots. A plate is secured to a flange at the end of the socket by having peripheral projections thereof engaged by the reversely bent edge of the flange. The plate is formed to have a plurality of outwardly extending spaced flanges which are lanced to provide springfingers, an opposite pair of which are twisted to provide locking points, the others of which are formed to provide springfingers for extending over the edges of an aperture in a support to which the socket is secured. The aperture is circular except for an inwardly extending tab and a notch at one side thereof which is cut from the peripheral edge of the aperture to form a corner on which the point of the releasable finger rests. The locking finger on the opposite flange has a point which engages the metal inwardly of the aperture for locking the opposite side of the socket within the receptacle. The flanges are spaced apart equal distances except for the flange having the releasable finger which is spaced a greater distance from an adjacent flange which is substantially the width of the tab. This orients the socket in the receptacle and positions the releasable locking finger so that on pushing the socket home within the aperture the releasable locking finger will be in position to engage the corner adjacent to the slot.

The side edge of the flange having the releasable locking finger is sloped inwardly toward the base so that it may be rotated toward the tab to a position where the releasable locking finger will move from the corner into the slot permitting the socket to be hinged downwardly a sufficient distance to release the opposite locking finger and permit the socket to be moved outwardly of the aperture and from the receptacle. A simple inward push of the socket locks the socket within the receptacle and a slight rotation thereof and a hinged movement releases the socket and permits its removal.

BRIEF DESCRIPTION OF THE DRAWINGS

FIG. 1 is a view in elevation of a socket applied to a panel or receptacle in a manner embodying features of the present invention;

FIG. 2 is an enlarged view of the structure illustrated in FIG. 1, as viewed from the point 2 thereof;

FIG. 3 is a broken sectional view of the structure in FIG. 2, as viewed from line 3-3 thereof, with the locking finger in latch position;

FIG. 4 is a broken sectional view of the structure illustrated in FIG. 2, taken on the line 4-4 thereof;

FIG. 5 is a broken view of the structure illustrated in FIG. 2, showing the releasable locking finger in unlatched position;

FIG. 6 is a view of the releasable locking finger at the time of being inserted into the aperture of the receptacle;

FIG. 7 is a sectional view of the structure illustrated in FIG. 2, taken on line 7-7 thereof, showing the releasable locked finger in latched position;

FIG. 8 is a sectional view of the structure illustrated in FIG. 5, taken on the line 8-8 thereof, after the rotation of the socket and the release of the locking finger; and FIG. 9 is a sectional view of the structure illustrated in FIG. 5, taken on the line 7-7 thereof.

DESCRIPTION OF THE PREFERRED EMBODIMENT

The socket 11 has a tubular body 12 which is flanged inwardly at 13 and formed into a cylindrical collar to which a sealing tube 14 is secured. A washer 15 abuts the flange 13 and is provided with an extending arm 16 having a finger on the end to which a connector 17 for a ground wire is releasably secured. The forward end of the body 12 is drawn outwardly to provide a flange 18, the edge of which is reversely bent to form a securing flange 19 which extends over a plurality of outwardly extending fingers 21 of a washerlike plate 22 to secure the plate in firm fixed position on the flange 18. The washerlike plate 22 has a plurality of spaced flanges 23 extending outwardly therefrom the outer ends of which are bent inwardly to form cam surfaces which readily enter an aperture 24 of a receptacle or other supporting member 25. Oppositely disposed outwardly extending flanges 26 and 27 have fingers 28 laced therefrom and twisted to provide a locking point 29 on the end thereof. The flange 26 is spaced a greater distance from the adjacent flange 23 than the other flanges are spaced from each other. A tab 31 of slightly less width than said greater distance, extends inwardly of the peripheral edge of the aperture 24 and locates the socket relative to the receptacle 25.

As illustrated in FIGS. 5, 6, 7 and 8, the flange 26 has the edge 32, which is located adjacent to the tab 31, sloped inwardly toward the bottom of the flange. As will be noted in FIG. 6, the upper end of the flange 26 engages the adjacent edge of the tab 31 and so locates the flange 26 that when the socket is pushed inwardly the point 29 of the finger 28 will engage the metal of the receptacle 25 inwardly of the aperture 24 and adjacent to a notch 33 located at the edge of the tab 31 engaged by the finger 26.

The flanges 23 have fingers 30 laced therefrom and bent outwardly at 34 and inwardly at 35 so as to pass within the edge of the aperture 24 to provide pressure engagement therewith. After the socket is located in the aperture by the outer sloping end of the flanges, the forward movement produces the inward deflection of the locking fingers 28 and the outer movement of the points 29 thereof into positive locking engagement for securing the socket to the receptacle 25. A ring 36 of elastomeric material is bonded to the reversely bent flange 19 for the purpose of sealing the socket to the receptacle 25. The body of the socket has a pair of oppositely disposed bayonet slots 37 and a slot 38 formed therein, the latter of which receives a projection on the base of a spring-pressed contact-carrying member (not shown) for orienting a pair of contacts thereon when a double-filament lamp is supported by the socket.

When it is necessary to remove the socket, the sloped edge 32 of the flange 26 permits the socket to be rotated to move the flange 26 toward the tab 31 to a position illustrated in FIG. 8, which moves the point 29 of the finger 28 from the edge of the metal adjacent to the aperture 24 into the notch 33. This permits the socket to be hinged downwardly an amount sufficient to move the point 29 of the finger 28 on the flange 27 from the edge of the aperture 24 and the socket from the receptacle 25. With this construction the worker in an automobile plant is only required to push the socket into the aperture 24 until a snap action takes place to indicate that the points of the fingers 28 have passed through the aperture 24 and have moved into locked engagement with the inner surface of the receptacle 25. This eliminates the additional movement in rotation which often resulted in the socket becoming detached because of the failure to execute the proper degree of rotation after the socket was inserted.

With the present arrangement the socket is oriented in the aperture by the tab 31 in such manner that both of the locking fingers 28 will move into locked position when the socket is pushed into the aperture the necessary amount. The inwardly extending tab 31 at the edge of the aperture 24 and the engagement thereof by the outer portion of the flange 26 accurately locates the point 29 of the releasable finger 28 so that it will move to locked position when the socket is moved directly into the aperture. The notch provided by the sloping edge 32 of the flange 26 and the location of the notch 33 adjacent to the inwardly extending tab 31 permits the locking point 29 of the finger 28 to move from the engaged surface of the receptacle 25 into the notch 33 when the socket is rotated to move the flange 26 toward the tab 31. The downward hinging of the socket thereafter releases the opposite point 29 of the flange 27 from the edge of the aperture permitting the socket to be removed from the receptacle.

I claim:

1. In a socket to be applied to an aperture in a support, a tubular body having securing means for a base of a lamp which is insertable therein, a laterally extending flange on the lamp end of the body, spaced flanges extending outwardly from said lateral flange, a pair of oppositely positioned of said flanges having locking fingers lanced from and deflected outwardly of the outer faces thereof in position to pass over the edge of the support aperture and engage the surface located outwardly of the edge, a pair of said outwardly extending flanges being spaced a greater distance apart than the distance the other outwardly extending flanges are spaced from each other for receiving a tab extending inwardly of the edge of the support aperture and of a width slightly less than said greater distance which locates the socket relative to the support and permits the socket to be releasably installed by a direct forward movement thereof into the aperture.

2. In a socket to be applied to an aperture in a support as recited in claim 1, wherein said support has a notch located adjacent to the edge of the aperture into which a locking finger will move to released position upon the rotation of the socket.

3. In a socket to be applied to an aperture in a support as recited in claim 2, wherein the side edge of an outwardly extending flange located adjacent to the tab has a notch which permits the movement of said outwardly extending flange toward the tab when the socket is in locket position.

4. In a socket, a cylindrical body which receives and supports the base of a lamp, a plurality of spaced outwardly extending flanges on said body which are capable of entering an aperture in a receptacle, two of said flanges having struck-out locking fingers thereon which after passing through the aperture engage the inner surface the material defining the aperture for releasably retaining the socket in locked relation with the receptacle by the single forward movement of the socket.

5. In a socket as recited in claim 4, wherein a pair of said outwardly extending flanges are spaced a greater distance apart than the other of said flanges for receiving a tab extending inwardly of the edge of the aperture of a width slightly less than said greater distance for orienting the socket relative to the receptacle.

6. In a socket as recited in claim 5, wherein the edge of the aperture has a notch extending therein located adjacent to one of the locking fingers by which it is released when rotated thereinto.

7. In a socket as recited in claim 6, wherein the side edge of said finger adjacent to said tab has a notch therein which permits said edge of said finger to be moved over the tab for moving the releasable locking finger from locked position into said notch at the edge of said aperture.

8. In a socket as recited in claim 7, wherein said flange with the locking finger and said notch in said aperture are located adjacent to one edge of said tab.

9. In a socket as recited in claim 8, wherein said outwardly extending flanges other than those with the locking finger have a finger lanced outwardly therefrom and formed to provide cam surfaces which engage the edge of the aperture to provide pressure engagement therewith.

10. In a socket as recited in claim 1, wherein said spaced flanges extend from a washerlike base which is constructed from a spring material, said washerlike base being secured to said socket flange by the reverse bending of the edge thereof, other of said outwardly extending flanges having cam fingers lanced therefrom in position to engage the edge of said aperture, one of said flanges which is spaced the greater distance apart having a cam finger, the other having the releasable locking finger having a notch in the side edge adjacent to said tab, said support having a notch in said aperture wall located adjacent to said tab on the side engaged by the flange having the releasable finger, said releasable finger moving into the notch when the notch in the flange thereof is arcuately advanced over the tab to release the socket from the support.